July 24, 1962 E. ZEMLA 3,046,460
MECHANICAL OSCILLATING ELEMENTS FOR TIMEPIECES AND THE LIKE, AND
ELECTRONIC ACTUATING MEANS THEREFOR
Filed June 15, 1959 5 Sheets-Sheet 1

Inventor:
Ewald Zemla
by:
Michael S Striker
Attorney

July 24, 1962 E. ZEMLA 3,046,460
MECHANICAL OSCILLATING ELEMENTS FOR TIMEPIECES AND THE LIKE, AND
ELECTRONIC ACTUATING MEANS THEREFOR
Filed June 15, 1959 5 Sheets-Sheet 3

Inventor:
Ewald Zemla
by:
Michael S Striker
Attorney

July 24, 1962  E. ZEMLA  3,046,460
MECHANICAL OSCILLATING ELEMENTS FOR TIMEPIECES AND THE LIKE, AND
ELECTRONIC ACTUATING MEANS THEREFOR
Filed June 15, 1959  5 Sheets-Sheet 5

Inventor:
Ewald Zemla
by
Michael S. Striker
Attorney

United States Patent Office 3,046,460
Patented July 24, 1962

3,046,460
MECHANICAL OSCILLATING ELEMENTS FOR TIMEPIECES AND THE LIKE, AND ELECTRONIC ACTUATING MEANS THEREFOR
Ewald Zemla, Pforzheim, Baden, Germany, assignor to Durowe A.G., Pforzheim, Baden, Germany
Filed June 15, 1959, Ser. No. 820,287
Claims priority, application Germany June 14, 1958
16 Claims. (Cl. 318—132)

The present invention relates to mechanical oscillating elements, such as balances for timepieces and the like whose function is to determine the exact time, and to electronic actuating or control means therefor, preferably a transistor feedback amplifier circuit.

It is already known to provide a control coil on a swingable or oscillatable mechanical system, and to combine the coil with a stationary permanent magnet. The coil is connected with the grids of two triodes in a push-pull arrangement. When the mechanical system receives a mechanical or bodily impulse, the self-excited electric system begins to oscillate and, owing to the cooperation between the control coil and the magnet, the mechanical system, too, is caused to oscillate up to a given amplitude. In such oscillation-generating assemblies, the electrical frequencies equal the mechanical frequencies. To be operative, such a system requires two triodes and a considerable number of additional electronic components. Moreover, an external impulse is necessary to start or trigger the operation of such assemblies.

According to another prior proposal, a swingable pendulum is utilized and is combined with a permanent magnet telescoped into a pair of coils, i.e. a driving coil and a control coil. Both coils are magnetically coupled with each other and are further connected with a transistor and with a current source in such a manner as to produce a self-excited electric system provided that the feedback between the coils is of sufficient magnitude. Such feedback is produced by the buildup of mechanical oscillations performed by the permanent magnet, whereupon the electronic system begins to oscillate at a frequency higher than the frequency of mechanical oscillations performed by the magnet. The driving coil then imparts a mechanical impulse to the pendulum up to the time when the electric oscillations terminate, such impulses being sufficient to maintain the pendulum in motion. A disadvantage of such systems is in that they cannot start oscillations by themselves, i.e. the pendulum must be set in motion by an external mechanical impulse.

According to a further proposal, a permanent magnet is installed on the balance of a timepiece and, as it travels along a control coil, an impulse is generated in the latter which impulse is thereupon amplified and transmitted to a driving coil which maintains the balance in oscillatory motion. This system, too, requires an outside impulse to set the balance in motion.

It has also been proposed to provide a driving coil or spool on the balance of a time piece in such a manner that the driving coil may cooperate with a control coil located between two permanent magnets. The control coil is installed in the control circuit and the driving coil in the plate circuit. In the quiescent condition of the system, both coils are coupled in such a way that the electronic assembly is capable of self-excitation at a high frequency. Since a direct current flows in the second or driving coil, an attracting force develops between this coil which is carried by the balance and the magnetic field; this sets the balance in motion. The mechanical oscillations increase up to a fixed mechanical amplitude which thereupon remains unchanged.

An important object of the present invention is to provide a system of the above outlined character which is particularly suitable for use in high-precision electric timepieces.

A further object of the instant invention is to provide an electronic system for imparting and maintaining oscillations of a swingable element which is so constructed that the extent of oscillatory movements may be varied within a wide range.

An additional object of the instant invention is to provide a system of the above outlined characteristics which comprises a comparatively small number of relatively inexpensive component parts, which occupies little space and which, consequently, may be built into very small time pieces, such as electric wrist watches and the like.

A concomitant object of the present invention is to provide an electric wrist watch embodying a balance driven by the above outlined electronic system.

Still another object of the invention is to provide an electronic system for imparting controlled oscillations to a mechanical element, such as the balance of a timepiece, which is capable of maintaining the oscillations of the element unchanged even if the supply of current or the amplitude of produced voltage impulses should change.

With the above objects in view, the invention resides in the provision of an oscillatable mechanical element, e.g. the time-controlling balance of a timepiece or the like, whose oscillations are brought about and controlled in contact-free manner by electronic means, preferably including a transistor feedback amplifier circuit. The actuating means comprises a system of one or more magnets, preferably permanent magnets, and a driving coil which cooperates with the magnet system. The driving coil is preferably connected to and thus moves in the rhythm of the oscillatable element relative to the then stationary magnetic field. A further feature of the invention resides in the provision of a sweep generator circuit, the aforementioned driving coil being installed in one branch of said sweep generator circuit, preferably in the collector or anode branch. During relative mechanical movements of the coil with respect to the magnet system or vice versa, a substantially sinuous voltage is induced in the driving coil which is impressed to the base of a transistor or to the grid of an electron tube. In this manner, the sweep is controlled synchronously with the mechanical movement.

The sweep generator may be one of many known circuits, as long as a sweep can be produced therein. Thus, the sweep generator circuit may comprise one or more electron tubes or one or more transistors, the latter being preferred in many instances. As compared with known oscillator circuits for use in connection with oscillatable mechanical elements, the advantage of a sweep generator is in that in utilizes a signal coil whose self-inductance is not critical for proper operation of the system. On the other hand, in the presently utilized oscillators with feedback, proper oscillation depends largely upon the dimensioning, quality and mutual inductivity of the coils, i.e. upon the relative positioning of the coils. If the resultant feedback is not of sufficient magnitude, rather complicated adjustments must be made which are particularly difficult if the dimensions of parts are small. In addition, all undesirable reactions between the magnet system and the moving coil in a sweep generator are avoided because the magnet system, together with the driving coil, synchronizes or triggers the entire assembly.

A very advantageous arrangement is arrived at when the permanent magnet is stationary and the driving coil is connected to the oscillatable mechanical element; however, it is also possible to utilize a movable or oscillatable magnet and a stationary driving coil.

The sweep generator is preferably so arranged that it can move the oscillatable element from its neutral or idle position and that it can cause the latter to begin its oscillations in two opposing directions from the neutral position. This can be achieved, for example, if the natural oscillation frequency of the mechanical element and the electrical frequency of the sweep generator differ only slightly from each other. However, it is equally possible to utilize systems in which the natural frequency of the oscillatable element is a multiple or only a fraction of the electrical frequency of the sweep generator, i.e. the sweep generator is capable of moving the oscillatable element from the latter's idle position regardless of whether its electric frequency equals, is less, or more than, the natural frequency of the oscillatable element.

Though a permanent magnet system is preferred, the use of one or more electromagnets instead of a permanent magnet system is in no way excluded. The advantage of permanent magnets is in that they simplify the entire arrangement and in many instances occupy less space which is important in most timepieces, particularly in comparatively small wrist watches. In order to provide a strong magnetic field, the permanent magnet system may comprise a "main" magnet which is located opposite, i.e. aligned with, the driving coil when the oscillatable mechanical element is in its neutral position, and two additional differently polarized "auxiliary" magnets located at the opposing sides of the main magnet whereby comparatively strong magnetic fields develop between the latter and the auxiliary magnets.

The oscillatable element may receive driving or actuating impulses in any of its positions, e.g. once during each full oscillation or at least once during each half oscillation. This often results in that the duration of half oscillations is not uniform which is very undesirable, particularly in high-precision timepieces.

Such drawbacks are avoided in accordance with the present invention by the provision of an electronic driving or actuating system for contact-free actuation of a periodically oscillatable mechanical element, such as the balance of a timepiece, which utilizes a system of magnets and coils arranged in part on a stationary member and in part on the swingable or oscillatable element to produce at least one impulse during each oscillation of the swingable mechanical element and in which the impulses occur symmetrically with respect to the central or neutral position of the swingable element, i.e. in the position between two half oscillations in two opposing directions. The impulse influences both halves of a full oscillation to the same extent whereby any inaccuracies in oscillations, as a consequence of impulses of different magnitude, are eliminated for all practical purposes. An important additional advantage of such an electronic driving or actuating system is in that, assuming certain changes would occur for one or another reason in the current strength or in the voltage, such changes do not affect the uniformity of oscillations because they merely cause a widening or symmetrical displacement of effective impulse or impulses with respect to the center of oscillations. Such changes are brought about, for example, upon changes in the temperature of transistors utilized in the system or by a transposition of the working point of the transistor.

The arrangement may be such that a driving impulse is imparted to the oscillatable element shortly before the latter reaches its central position, and that the impulse is maintained a corresponding period of time after the element passes beyond its central position. Any undesirable effects upon the oscillatable element can also be avoided if a driving impulse is transmitted during each half oscillation of the element, e.g. the balance of a timepiece, the impulses being then of equal magnitudes and equally spaced at the opposing sides of the central position of the oscillatable element. It is equally possible to simultaneously utilize both above-described types of impulses. If two driving impulses are imparted during each oscillation symmetrically with respect to the central or neutral position of the oscillatable element, it is then desirable that the impulses be imparted at points comparatively close to such central position. It is, of course, equally possible to impart several impulses during each half oscillation of the swingable mechanical element, as long as the number, phase and type of impulses are equal during both half oscillations, i.e. during the movements of the oscillatable element to the opposing sides from its central or neutral position.

The generation of impulses in accordance with the present invention is preferably brought about in that the mutually affecting cooperating components of the magnetic system and of the coil system, for example, a system consisting of two or more magnets and a coil, are so arranged that, when the oscillatable element is in its central or neutral position, all parts are arranged symmetrically with respect to the central plane passing through the axis of the swingable or oscillatable element. It is important that an electrical symmetry be brought about which, in many instances results from the mechanical symmetry or is related thereto. It has no bearing on the actual operation whether the magnetic system is stationary and the coil system moves, or vice versa.

If a multi-magnet and a multi-coil system are utilized, it is preferred to dispose the components of both systems at equal distances or intervals from the above-mentioned central or neutral position of the oscillatable element. For example, an advantageous arrangement is the one in which three coils are spaced through 120° with respect to each other. This then also applies to the disposition of the components constituting the magnetic system.

In order to obtain the desired form of driving impulses, the magnetic system may consist of a single magnet or of one or more pairs of magnets. However, it is usually sufficient for satisfactory operation of the assembly if a single pair of magnets is utilized which then constitute the entire magnetic system. It is preferred in such instances to provide a single coil on the oscillatable element and, when the latter is in its neutral or central position, both magnetic components are located at equal distances from the movable coil, as seen in the axial direction, i.e. the sector angles between the axis of the oscillatable element in neutral position and both magnetic components are of equal magnitudes.

The magnets may be formed in many different shapes, and the energization or excitation can be brought about over a special winding. Since the space available in a timepiece, especially a wrist-watch is rather small, it is usually desirable to utilize permanent magnets. When two permanent magnets are utilized, their dimensions are preferably identical. Such two permanent magnets are then arranged in such a way as to be of unlike polarities at their ends which are turned toward the coil, i.e. one of the magnets has its north pole and the other magnet has its south pole turned toward the coil.

In order to enhance the effect of the magnets, it is often advisable that, when the oscillatable element and the coil connected therewith are in neutral or central position, the magnets are provided below the sides of the coil, as seen in the axial direction of the coil, the term "below" merely indicating the direction and not necessarily the actual position of the magnets.

As before stated, the magnets may be of various shapes though it is often advisable and preferred, for convenient manufacture, to utilize cylindrical magnets. The effect of the magnets may be increased by forming same with substantially rectangular cross-sectional contour of a width to correspond substantially to the distance between the sides of the coil, as seen in the axial direction.

The novel features which are considered as characteristic for the invention are set forth in particular in the appended claims. The invention itself, however, both as to its construction and its method of operation, together with additional objects and advantages thereof, will be best understood from the following detailed description of certain specific embodiments when read in connection with the accompanying drawings, in which:

FIG. 10b is a section similar to FIG. 10a, taken on line 10b—10b of the modification of FIG. 10a;

Figure 1:
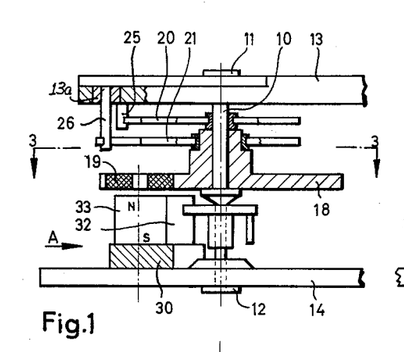
FIG. 1 is a schematic side elevational view of an oscillatable mechanical element combined with certain components of electronic actuating means therefor, some of the parts being shown in section taken along the line 1—1 of FIG. 3, as seen in the direction of arrows.
Figure 2:
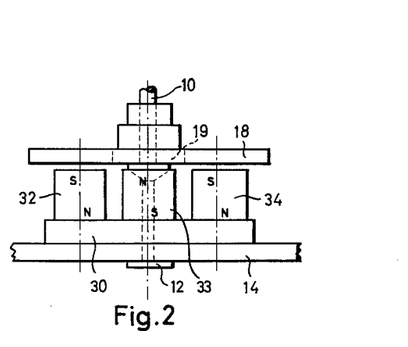
FIG. 2 is an end elevational view of the assembly shown in FIG. 1, as seen in the direction of arrow A, certain parts of the system having been omitted.
Figures 3, 4, 5:
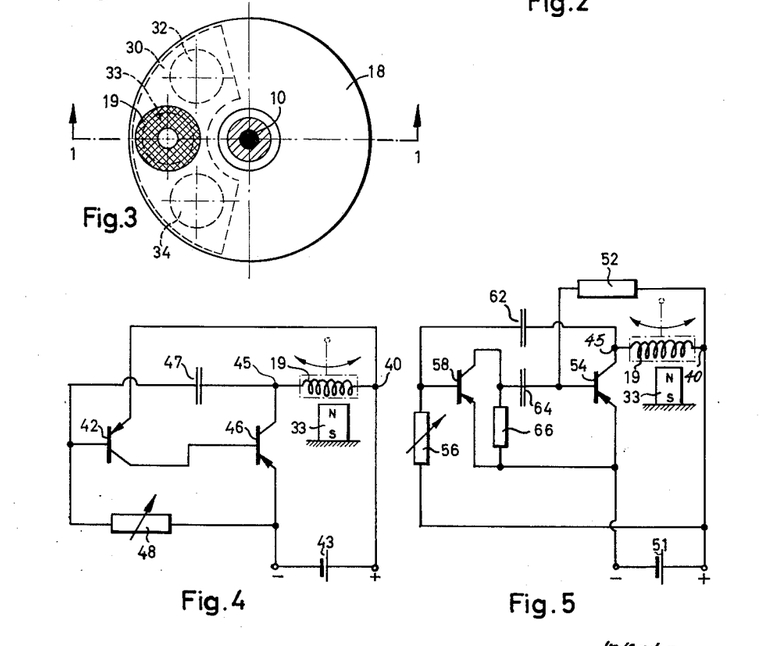
FIG. 3 is a section taken on the line 3—3 of FIG. 1, as seen in the direction of arrows.
FIG. 4 is a schematic illustration of one form of a sweep generator circuit to be used, for example, in connection with the system shown in FIGS. 1 to 3.
FIG. 5 is a similar schematic illustration of a modified sweep generator circuit.

Referring now in greater detail to the illustrated embodiments, and first to that represented in FIGS. 1 to 3, there is shown a balance-wheel arbor or staff 10 having a first end rotatably mounted in a bearing 11 carried by the pillar plate 13, and a second end rotatably received in a second bearing 12 supported by the bridge 14. A discoid oscillatable mechanical element or balance wheel 18 is fixed to and thus performs angular movements with the staff 10. At a point distant from its axis, element 18 carries a circular driving coil or spool 19. The illustrated structure further comprises two helical springs 20, 21 each of which has an inner end connected to the staff 10 and to element 18, respectively. The outer end of helical member 20 is anchored in a stud 25 carried by the pillar plate 13, the latter further supporting a second stud 26 connected with the outer end of resilient member 21. The purpose of springs 20, 21 is to deliver current to driving coil 19 and, consequently, one thereof must be electrically insulated from the ground. FIG. 1 shows a layer of insulating material 13a embedded in the pillar plate 13 to receive the free end of stud 26 which is connected to helical member 21. The conductors leading from the driving coil 19 to helical members 20, 21 are not shown in FIG. 1.

Arbor 10 further carries the customary take-off means TO for transmitting movements to the non-represented clockwork or watch mechanism of the timepiece in which the assembly of FIGS. 1 to 3 is installed. A satisfactory take-off system for transmitting movements from the balance wheel to the indicating hand or hands of a clockwork mechanism is shown, for example, in U.S. Patents Nos. 2,789,411 and 2,800,763 and 2,713,764.

Bridge 14 supports a yoke 30 of magnetizable material which, in turn, carries three parallel permanent magnets 32, 33 and 34. Magnets 32, 34 thereinafter called "auxiliary" magnets are equidistant from and arranged symmetrically with respect to the central (hereinafter called "main") magnet 33 and with respect to the plane passing through the axes of balance 18 and driving coil 19 (see the section line 1—1 in FIG. 3) when the balance and the driving coil are idle. All three permanent magnets are but need not necessarily be of cylindrical contour.

When the balance 18 is in its idle or central position, the main or median magnet 33 is coaxial with the driving coil 19 (see FIG. 3). Polarization of main magnet 33 is directly opposite or unlike that of auxiliary magnets 32, 34 (see FIG. 2).

Referring now to the sweep generator circuit shown in FIG. 4 one terminal or contact point 40 of schematically represented driving and control coil 19 is electrically connected to the emitter of a triode or transistor 42 and with the positive terminal of a current source 43. The other terminal or contact point 45 of coil 19 is electrically connected with the collector of a second triode or transistor 46 and, over a condenser 47, with the base of the aforementioned transistor 42. The base of second transistor 46 is electrically connected with the collector of transistor 42, and the base of transistor 42 is connected to the negative terminal of current source 43 and to the emitter of transistor 46 over an adjustable resistance 48.

In the somewhat modified sweep generator circuit of FIG. 5, the terminal 40 of driving coil 19 is electrically connected to the positive terminal of a current source 51 and, over a resistance 52, with the base of a triode or transistor 54. Terminal 40 is also connected with the base of a second triode or transistor 58 over an adjustable resistance 56. A lead connects the other terminal 45 of driving and control coil 19 with the collector of transistor 54, the terminal 45 being also connected with the base of transistor 58 over a condenser 62. A lead connects the collector of transistor 58 with a condenser 64 and thereover with the base of transistor 54. A leakage resistance 66 is connected between the emitter and the collector of transistor 58.

The sweep generator circuits of FIGS. 4 and 5 are known; therefore, their operation is not believed to require detailed explanation here. As before stated, transistors 42, 46 and 54, 58 may be replaced by suitable electron tubes.

Figure 6:
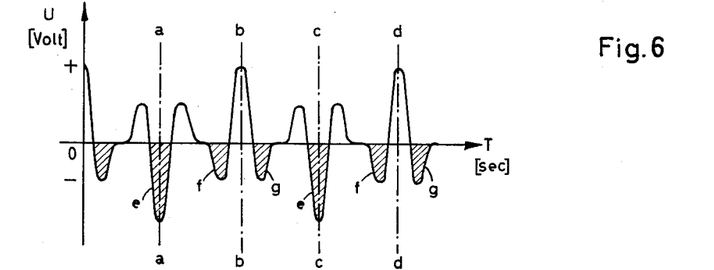
FIG. 6 is a graph showing a curve of symmetrically distributed impulses of different amplitudes imparted to the mechanical element shown in FIGS. 8 to 11.

FIG. 6 illustrates the curve of voltage induced in the driving and control coil 19 on balance 18 by the magnetic system consisting of magnets 32, 33 and 34. Time T in seconds is measured along the X-axis, and the induced voltage U along the Y-axis. The successive central or idle positions of balance 18 are shown in phantom lines a—a, b—b, c—c, and d—d. The areas e, f, g are indicative of the effective voltage, i.e. of such voltage impulses which contribute to the oscillation of balance 18, and are shown in FIG. 6 by cross-hatching. As will be readily understood by referring to the sweep generator circuit of FIG. 4, the driving impulses e, f, g are strictly negative voltage impulses because the first triode or transistor 42 in this example is a p-n-p transistor.

The comparatively large voltage impulse *e* is generated symmetrically with respect to the neutral or central position *a—a* of the oscillatable element 18 and if, by suitable electronic control, the arrangement is such that the voltage impulse causes a corresponding current impulse in the coil 19, the voltage impulse *e* may be considered to indicate at the same time the magnitude and the nature of the driving impulse.

During the travel of mechanical element or balance 18 through the next neutral position *b—b*, two voltage impulses *f* and *g* are produced in the driving coil 19; these impulses are symmetrical with respect to and equidistant from line *b—b*. By suitable electronic control, it can be achieved that these voltage impulses *f, g* produce corresponding current impulses in the coil 19, such current impulses acting as driving impulses upon the balance 18, namely, a certain period of time before the coil 19 reaches the neutral *b—b* and an equal period of time thereafter. The just described procedure is then repeated in the same sequence.

By suitable adjustment of the electronic control means, only the median impulse *e* could be utilized for oscillating the balance 18, i.e. the impulses *f, g* could be suppressed in their entirety. However, it is generally desirable to take advantage of all symmetrical voltage impulses for oscillating the balance 18.

Figure 7:
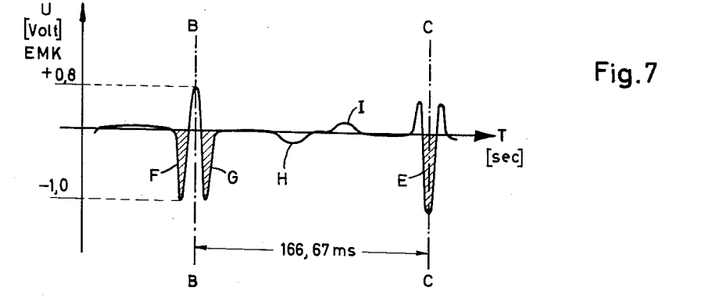
FIG. 7 is an oscillogram of the electromotive force induced in the coil connected to and oscillating with the mechanical element.

In the oscillogram of FIG. 7, the lines representing the neutral positions of driving and control coil 19 are identified by capital letters B—B and C—C, and the voltage impulses by letters F, G, respectively. The curve of FIG. 7 is formed with two humps H and I which is attributable to the fact that the balance 18 oscillates through a comparatively large angle of, say, 270° and, at the end of each oscillation, a comparatively small electromotive force is generated. The maxima of such voltage, however, are negligible and, at any rate, insufficient to induce the control system to operate the driving assembly. Consequently, such electromotive forces need not be considered.

It should be mentioned here that the igniting or starting voltage of the electronic means utilized for the control, e.g. triodes in the form of electron tubes or transistors, must be such that only certain desired impulses should actually bring about an ignition. This occurs upon every impulse which is symmetrical with respect to the neutral or median position of the balance and of the coil connected thereto.

Figures 8, 9:
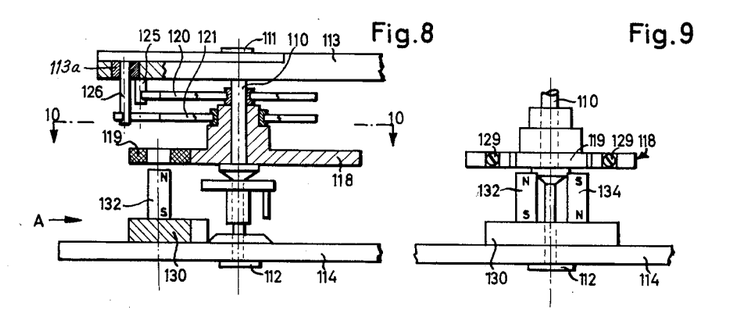
FIG. 8 illustrates a modified oscillatable element and certain components of the electronic actuating means therefor, some of the parts being shown in section taken substantially along the line 8—8 of FIG. 10, as seen in the direction of arrows.
FIG. 9 is an end elevational view of the assembly shown in FIG. 8, as seen in the direction of arrow A1, certain parts having been omitted for the sake of clarity.
Figure 10:
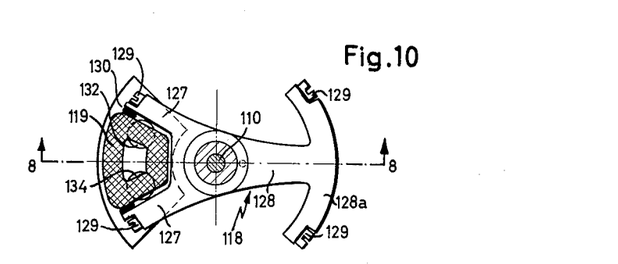
FIG. 10 is a section taken on the line 10—10 of FIG. 8, as seen in the direction of arrows.

Referring now to FIGS. 8 to 10, the balance staff 110 is rotatably mounted in bearings 111, 112 carried by the pillar plate 113 and by the bridge 114, respectively. Staff 110 is connected with a non-circular oscillatable element or balance 118 which latter carries a driving coil 119 of non-circular contour at a point distant from the axis of staff 110, i.e. close to one end of the balance. The outer ends of helical springs 120, 121 are anchored in studs 125, 126, respectively, these studs being carried by the pillar plate 113, and the stud 126 being insulated from member 113 by a layer of electric insulating material 113a. The inner ends of springs 120, 121 are secured to the staff 110 and to the balance 118, respectively. The conductors leading from springs 120, 121 to the terminals of driving coil 119 are not shown in FIGS. 8 to 10.

One half of balance 118 is bifurcated (see FIG. 10), its legs 127 embracing and retaining therebetween the aforementioned driving coil 119 of substantially trapeziform configuration. The latter is secured at two or more points to legs 127 by a suitable adhesive, e.g. a synthetic resin. The remaining portion of the balance 118 at the other side of staff 110 is T-shaped, it having a web 128 and a cross member 128a. The cross member 128a and the legs 127 carry balancing or equalizing screws 129. The balance 118 further carries certain components of the customary take-off means TO for transmitting movements to the non-illustrated clockwork or watch mechanism which rotates the indicating hand or hands of the timepiece.

Bridge 114 supports a yoke 130 of magnetizable material, the latter in turn supporting two permanent magnets 132 and 134 which are of cylindrical contour and parallel with each other. Magnets 132, 134 of opposite polarity are disposed symmetrically with respect to the axis of symmetry of balance 118 when the latter is in its central position (see the section line 8—8 in FIG. 10).

Figure 11:
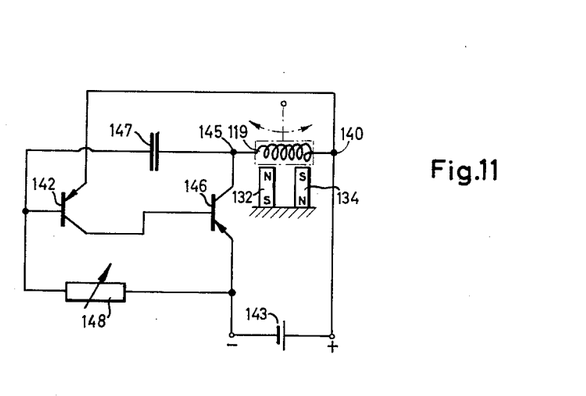
FIG. 11 illustrates schematically a third sweep generator circuit constituting the means for oscillating, for example, the mechanical element of FIGS. 8 to 10.

In the sweep generator circuit shown in FIG. 11, the terminal 140 of driving coil 119 is electrically connected with the emitter of a triode or transistor 142 and with the positive terminal of a current source 143. The other terminal 145 of coil 119 is electrically connected with the collector of a second triode or transistor 146 and, over a condenser 147, with the base of the aforementioned transistor 142. The base of transistor 146 is electrically connected to the collector of transistor 142. The base of transistor 142 is connected with an adjustable resistance 148 and over the latter with the emitter of transistor 146, as well as with the negative terminal of current source or battery 143.

Figure 10A:
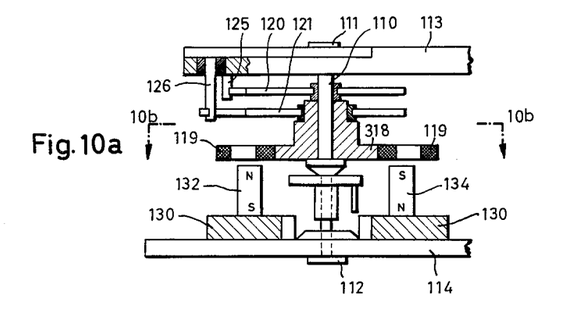
FIG. 10a is a section similar to FIG. 8, taken on line 10a—10a of FIG. 10b, of a modification of the embodiment of FIGS. 8 to 10.
Figure 10B:
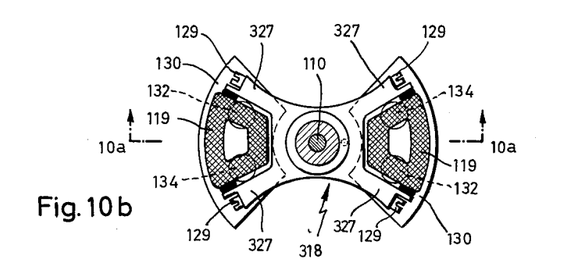

In FIGS. 10a and 10b a modification of the embodiment of FIGS. 8 to 10 is shown and similar parts are designated with the same numerals as designated in these figures.

Contrary to the balance 118 of FIGS. 8 to 10 there are two coils 119 arranged on a balance 318, each coil being embraced and held by a pair of legs 327. The two coils 119 are arranged in parallel or in series and cooperate each with a pair of permanent magnets 132, 134, each pair being arranged underneath a coil 119 as best seen in FIG. 10a when the balance 318 is in its position of rest as shown in the figures.

The operation of the system fitted with two coils and two pairs of magnets is similar to that having only one coil and one pair of magnets so that it need not be further explained.

A certain disadvantage of impulses represented in FIGS. 6 and 7 is in that the amplitudes of effective half waves, *e, f, g* are of different magnitudes and, consequently, the impulses transmitted to the balance per each half wave are not of desired magnitudes. The ratio of these amplitudes may be changed by varying the positions of the magnets with respect to the coil when the latter is in its idle or central position (see FIG. 10). For example, the arrangement may be such that the impulses corresponding to each half wave are substantially equal or that the amplitudes of these impulses are of equal magnitude. The last mentioned modification is illustrated in FIG. 12 which utilizes the reference numerals of FIG. 6 followed by a prime (′).

Figure 12:
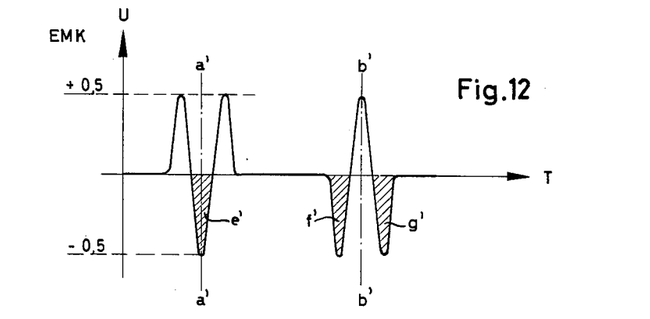
FIG. 12 is a graph showing the curve of electromotive force induced in the oscillatable coil, the curve shown in this illustration having equal amplitudes.

FIGS. 13 to 16 illustrate two slightly different arrangements of the driving spool with respect to the magnets which produce voltage impulses of the type shown in FIG. 12. However, it should be understood that the aforementioned changes in the amplitude of driving impulses may be brought about not only by changing the position of the magnets in circumferential direction with respect to the driving coil but also by changing the position of the magnets in radial direction, as well as by a composite shift of the magnets partly in radial and partly in circumferential direction.

Figure 13:
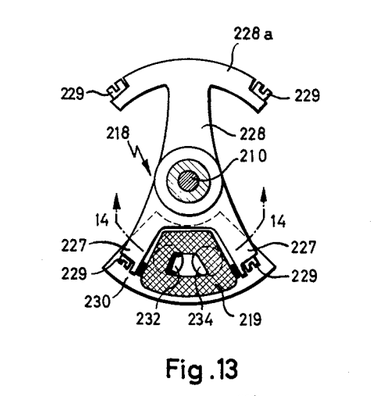
FIG. 13 is part elevational and part sectional view of a modified assembly similar to that of FIG. 10 but utilizing two differently arranged magnets.
Figure 14:
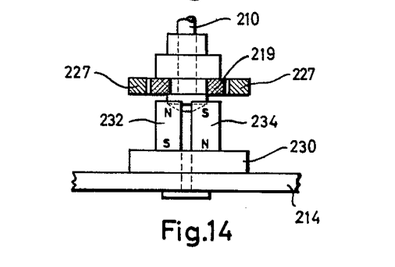
FIG. 14 is a section taken on the line 14—14 of FIG. 13, as seen in the direction of arrows.

In the embodiment of FIGS. 13 and 14, the staff 210 supports the oscillatable element or balance 218 in the manner already fully disclosed in connection with FIGS. 6 to 9. The balance is formed with a bifurcated portion having two legs 227 which receive therebetween and support the driving coil 219, the latter being secured thereto at two or more points by a suitable adhesive, such as a synthetic resin or the like. The other half of balance 218 is T-shaped and comprises a web 228 integrally formed with a cross member 228a. Cross member 228a and legs 227 carry four balancing or equalizing screws 229.

Bridge 214 supports a yoke 230 of magnetizable material mounting two spaced parallel cylindrical magnets 232 and 234. The polarity of permanent magnets 232, 234 is inverted and they are mounted comparatively close to each other. When the balance 218 oscillates, a uniform change in the flow of magnetic force lines embraced by the coil 219 is brought about in the manner as shown in FIG. 12.

Figure 15:
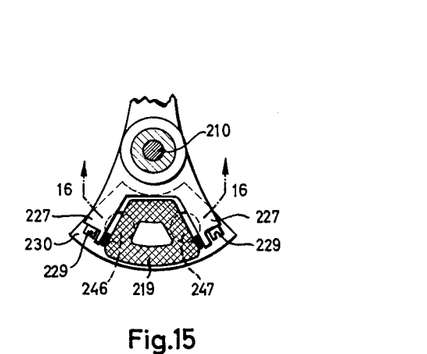
FIG. 15 is a fragmentary view, similar to that of FIG. 10 or 13, showing a further modification of the novel assembly with the magnets arranged in a different way.
Figure 16:
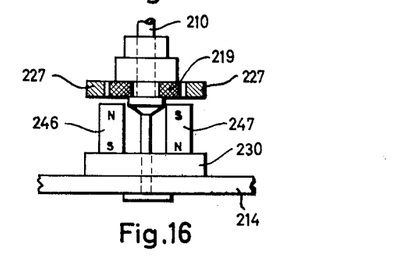
FIG. 16 is a section taken on the line 16—16 of FIG. 15, as seen in the direction of arrows.

Save for the positioning of permanent magnets 246, 247, the arrangement of the assembly shown in FIGS. 15 and 16 is the same as that which is illustrated in FIGS. 13 and 14. The distance between parallel magnets 246, 247 of circular cross-sectional contour is greater than that between magnets 232, 234, and their polarity is inverted, i.e. the north pole of magnet 246 and the south pole of magnet 247 are adjacent to the coil 219. When the balance 218 is set in motion, the assembly of FIGS. 15 and 16, too, brings about uniform changes in the flow of magnetic force lines embraced by the coil 219 in the manner similar to that shown in FIG. 12.

Without further analysis the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A system of the character described comprising, in combination: a mechanical oscillatable element; stationary magnet means; and an electric circuit for oscillating said element including a single coil means serving both as control and driving member and connected to and oscillatable with said element relative to said magnet means, a first electronic triode, a condenser electrically connected between an electrode of said first triode and one end of said coil for controlling said first triode in response to charge and discharge of said condenser, a source of continuous voltage having one pole connected to the other end of said coil, at least one resistance electrically connected between the other pole of said source and said electrode of said first triode, and a second electronic triode connected between said other pole of said source and said one end of said coil, and having a control electrode connected to said first triode for being controlled thereby.

2. In a timepiece, in combination: an oscillatable balance; stationary magnet means; and an electric circuit for oscillating said balance including a single coil means serving both as control and driving member and connected with and oscillatable with said balance relative to said magnet means, a first electronic triode, a condenser electrically connected between an electrode of said first triode and one end of said coil for controlling said first triode in response to charge and discharge of said condenser, a source of continuous voltage having one pole connected to the other end of said coil, at least one resistance electrically connected between the other pole of said source and said electrode of said first triode, and a second electronic triode connected between said other pole of said source and said one end of said coil, and having a control electrode connected to said first triode for being controlled thereby.

3. A system of the character described comprising, in combination: a mechanical oscillatable element; stationary permanent magnet means; and an electric circuit for oscillating said element including a single coil means serving both as control and driving member and connected to and oscillatable with said element relative to said magnet means, a first electronic triode, a condenser electrically connected between an electrode of said first triode and one end of said coil for controlling said first triode in response to charge and discharge of said condenser, a source of continuous voltage having one pole connected to the other end of said coil, at least one resistance electrically connected between the other pole of said source and said electrode of said first triode, and a second electronic triode connected between said other pole of said source and said one end of said coil, and having a control electrode connected to said first triode for being controlled thereby.

4. A system of the character described comprising, in combination: a mechanical oscillatable element; stationary magnet means; and an electric circuit for oscillating said element including a single coil means serving both as control and driving member and connected to and oscillatable with said element relative to said magnet means, a first transistor, a condenser electrically connected between the base of said transistor and one end of said coil for controlling said first transistor in response to charge and discharge of said condenser, a source of continuous voltage having one pole connected to the other end of said coil, at least one resistance electrically connected between the other pole of said source and said base of said first transistor, and a second transistor connected with its collector-emitter circuit between said other pole of said source and said one end of said coil, and having its base connected to said first transistor for being controlled thereby.

5. A system of the character described comprising, in combination: a mechanical element oscillatable between a central and two opposite extreme positions; stationary magnet means; and electric circuit means for oscillating said element and for imparting to said element during each oscillation at least one impulse substantially symmetrically with respect to said central position of the element, said circuit means comprising a single coil means serving both as driving and control member and connected to and oscillatable with said element relative to said magnet means, a first electronic triode, a condenser electrically connected between an electrode of said first triode and with one end of said coil for controlling said first triode in response to charge and discharge of said condenser, a source of continuous voltage having one pole connected to the other end of said coil, at least one resistance electrically connected between the other pole of said source and said electrode of said triode, and a second electronic triode connected between said other pole of said source and said one end of said coil, and having a control electrode connected to said first triode for being controlled thereby.

6. A system of the character described comprising, in combination: a mechanical element oscillatable between a central and two opposite extreme positions; stationary magnet means; and electric circuit means for oscillating said element and for imparting to the element symmetric impulses during each half oscillation thereof, said circuit means comprising a single coil means serving both as driving and control member and connected to and oscillatable with said magnet means, a first electronic triode, a condenser electrically connected between an electrode of said first triode and one end of said coil for controlling said first triode in response to charge and discharge of said condenser, a source of continuous voltage having one pole connected to the other end of said coil, at least one resistance electrically connected between the other pole of said source and said electrode of said triode, and a second electronic triode connected between said other pole of said source and said one end of said coil, and having a control electrode connected to said first triode for being controlled thereby.

7. A system of the character described comprising, in combination: a mechanical element oscillatable between a central and two opposite extreme positions; stationary magnet means; and electric circuit means for oscillating said element and for imparting to the element symmetric impulses during each half oscillation thereof shortly before and after the element is in said central position, said circuit means comprising a single coil means serving both as driving and control member and connected to and oscillatable with said element relative to said magnet means, a first electronic triode, a condenser electrically connected between an electrode of said first triode and one end of said coil for controlling said first triode in response to charge and discharge of said condenser, a source of continuous voltage having one pole connected to the other end of said coil, at least one resistance electrically connected between the other pole of said source and said electrode of said triode, and a second electronic triode connected between said other pole of said source and said one end of said coil, and having a control electrode connected to said first triode for being controlled thereby.

8. A system of the character described comprising, in combination: a mechanical oscillatable element having a central position; stationary magnet means comprising two magnets; and an electric circuit for oscillating said element including a single coil means serving both as control and driving member and connected to and oscillatable with said element, said magnets being disposed symmetrically with respect to said coil when the element is in central position, a first electronic triode, a condenser electrically connected between an electrode of said first triode and one end of said coil for controlling said first triode in response to charge and discharge of said condenser, a source of continuous voltage having one pole connected to the other end of said coil, at least one resistance electrically connected between the other pole of said source and said electrode of said triode, and a second electronic triode connected between said other pole of said source and said one end of said coil, and having a control electrode connected to said first triode for being controlled thereby.

9. A system of the character described comprising, in combination: a mechanical oscillatable element; stationary magnet means; and an electric circuit for oscillating said element including a single coil means serving both as control and driving member and connected to and oscillatable with said element relative to said magnet means, the greatest dimension of said magnet means in the direction of oscillation of said element approximating the width of windings of said coil in the axial direction, a first electronic triode, a condenser electrically connected between an electrode of said first triode and one end of said coil for controlling said first triode in response to charge and discharge of said condenser, a source of continuous voltage having one pole connected to the other end of said coil, at least one resistance electrically connected between the other pole of said source and said electrode of said triode, and a second electronic triode connected between said other pole of said source and said one end of said coil, and having a control electrode connected to said first triode for being controlled thereby.

10. A system of the character described comprising, in combination: a mechanical oscillatable element; stationary magnet means comprising at least one magnet of substantially rectangular cross-sectional contour; and an electric circuit for oscillating said element including a single coil means serving both as control and driving member and connected to and oscillatable with said element relative to said magnet means, a first electronic triode, a condenser electrically connected between an electrode of said first triode and one end of said coil for controlling said first triode in response to charge and discharge of said condenser, a source of continuous voltage having one pole connected to the other end of said coil, at least one resistance electrically connected between the other pole of said source and said electrode of said triode, and a second electronic triode connected between said other pole of said source and said one end of said coil, and having a control electrode connected to said first triode for being controlled thereby.

11. A system of the character described comprising, in combination: a mechanical oscillatable element; stationary magnet means comprising a pair of magnets disposed below said element; and an electric circuit for oscillating said element including a single coil means serving both as control and driving member and connected to and oscillatable with said element, said coil being of non-circular contour and having two sides each located above one of said magnets when the element is in idle position, a first electronic triode, a condenser electrically connected between an electrode of said first triode and one end of said coil for controlling said first triode in response to charge and discharge of said condenser, a source of continuous voltage having one pole connected to the other end of said coil, at least one resistance electrically connected between the other pole of said source and said electrode of said triode, and a second electronic triode connected between said other pole of said source and said one end of said coil, and having a control electrode connected to said first triode for being controlled thereby.

12. A system of the character described comprising, in combination: a mechanical element oscillatable between a central and two opposite extreme positions; stationary magnet means; and electric circuit means for oscillating said element and for imparting to the element symmetric impulses of equal amplitudes during each half oscillation thereof, said circuit means comprising a single coil means serving both as driving and control member and connected to and oscillatable with said element relative to said magnet means, a first electronic triode, a condenser electrically connected between an electrode of said first triode and one end of said coil for controlling said first triode in response to charge and discharge of said condenser, a source of continuous voltage having one pole connected to the other end of said coil, at least one resistance electrically connected between the other pole of said source and said electrode of said triode, and a second electronic triode connected between said other pole of said source and said one end of said coil, and having a control electrode connected to said first triode for being controlled thereby.

13. A system of the character described comprising, in combination: a mechanical element oscillatable between a central and two opposite extreme positions; stationary magnet means; and an electric circuit for oscillating said element and for imparting to said element at least one impulse symmetrically with respect to the central position of the element, the impulses imparted to said element being of equal amplitudes, said circuit comprising a single coil means serving both as driving and control member and connected to and oscillatable with said element relative to said magnet means, a first electronic triode, a condenser electrically connected between an electrode of said first triode and one end of said coil for controlling said first triode in response to charge and discharge of said condenser, a source of continuous voltage having one pole connected to the other end of said coil, at least one resistance electrically connected between the other pole of said source and said electrode of said triode, and a second electronic triode connected between said other pole of said source and said one end of said coil, and having a control electrode connected to said first triode for being controlled thereby.

14. A system of the character described comprising, in combination: a mechanical element oscillatable between a central and two opposite extreme positions; stationary magnet means comprising a main magnet and two auxiliary magnets disposed symmetrically at the opposing sides of said main magnet; and an electric circuit for oscillating said element including a single coil means serving both as control and driving members and connected to and oscillatable with said element relative to said magnets, said coil being aligned with the main magnet when the element is in central position, a first electronic triode, a condenser electrically connected between an electrode of said first triode and one end of said coil for controlling said first triode in response to charge and discharge of said condenser, a source of continuous voltage having one pole connected to the other end of said coil, at least one resistance electrically connected between the other pole of said source and said electrode of said triode, and a second electronic triode between said other pole of said source and said one end of said coil, and having a control electrode connected to said first triode for being controlled thereby.

15. A system of the character described comprising, in combination: a mechanical element oscillatable about a predetermined axis of rotation between a central and two opposite extreme positions; stationary magnet means comprising two spaced magnets; and an electric circuit for oscillating said element including a single coil means serving both as driving and control member and connected to and oscillatable with said element relative to said magnets, the axis of said coil being parallel with and spaced from said axis of rotation, said magnets being disposed symmetrically with respect to a radial line passing through said axis of rotation and the center of said coil when said element is in central position, said magnets extending, in said central position of said element, beyond the outer boundary of said coil in the direction of rotation thereof, a first electronic triode, a condenser electrically connected between an electrode of said first triode and one end of said coil for controlling said first triode in response to charge and discharge of said condenser, a source of continuous voltage having one pole connected to the other end of said coil, at least one resistance electrically connected between the other pole of said source and said electrode of said first triode, and a second electronic triode connected between said other pole of said source and said one end of said coil, and having a control electrode connected to said first triode for being controlled thereby.

16. A system of the character described comprising, in combination: a mechanical element oscillatable about a predetermined axis of rotation between a central and two opposite extreme positions; stationary magnet means comprising two spaced magnets; and an electric circuit for oscillating said element including a single coil means serving both as driving and control member and connected to and oscillatable with said element relative to said magnets, the axis of said coil being parallel with and spaced from said axis of rotation, said magnets being disposed symmetrically with respect to a radial line passing through said axis of rotation and the center of the coil when said element is in central position, said magnets extending, in said central position of said element, beyond the inner boundary of said coil in the direction of rotation thereof, a first electronic triode, a condenser electrically connected between an electrode of said first triode and one end of said coil for controlling said first triode in response to charge and discharge of said condenser, a source of continuous voltage having one pole connected to the other end of said coil, at least one resistance electrically connected between the other pole of said source and said electrode of said first triode, second electronic triode connected between said other pole of said source and said one end of said coil, and having a control electrode connected to said first triode for being controlled thereby.

References Cited in the file of this patent
UNITED STATES PATENTS

| | | |
|---|---|---|
| 2,829,324 | Sargeant | Apr. 1, 1958 |
| 2,877,399 | Shaull | Mar. 10, 1959 |
| 2,907,940 | Beyner | Oct. 6, 1959 |
| 2,950,447 | McShan | Aug. 23, 1960 |